United States Patent
Lee et al.

(10) Patent No.: US 9,657,138 B2
(45) Date of Patent: May 23, 2017

(54) METHOD FOR PREPARING POLYAMIDE RESIN

(71) Applicant: GS CALTEX CORPORATION, Seoul (KR)

(72) Inventors: Su-Jeong Lee, Daejeon (KR); Dong-Hun Hyun, Daejeon (KR); Hee-Jong Lee, Gwacheon-si (KR)

(73) Assignee: GS CALTEX CORPORATION, Seoul (KR)

(*) Notice: Subject to any disclaimer, the term of this patent is extended or adjusted under 35 U.S.C. 154(b) by 0 days.

(21) Appl. No.: 15/100,636

(22) PCT Filed: Dec. 3, 2014

(86) PCT No.: PCT/KR2014/011742
§ 371 (c)(1),
(2) Date: Jun. 1, 2016

(87) PCT Pub. No.: WO2015/084042
PCT Pub. Date: Jun. 11, 2015

(65) Prior Publication Data
US 2016/0297930 A1    Oct. 13, 2016

(30) Foreign Application Priority Data
Dec. 3, 2013 (KR) .................... 10-2013-0149324

(51) Int. Cl.
| | |
|---|---|
| *C08G 69/20* | (2006.01) |
| *C08G 69/24* | (2006.01) |
| *C08G 69/18* | (2006.01) |
| *B01D 3/00* | (2006.01) |
| *C08G 69/16* | (2006.01) |
| *C08L 77/02* | (2006.01) |
| *C08L 79/08* | (2006.01) |
| *B01D 61/02* | (2006.01) |
| *B01D 61/36* | (2006.01) |

(52) U.S. Cl.
CPC ............ *C08G 69/18* (2013.01); *B01D 3/009* (2013.01); *C08G 69/16* (2013.01); *C08G 69/20* (2013.01); *C08G 69/24* (2013.01); *C08L 77/02* (2013.01); *C08L 79/08* (2013.01); *B01D 61/025* (2013.01); *B01D 61/027* (2013.01); *B01D 61/362* (2013.01); *B01D 61/364* (2013.01); *B01D 2311/02* (2013.01)

(58) Field of Classification Search
CPC ...................................... C08G 69/20
USPC .......................................... 528/325
See application file for complete search history.

(56) References Cited

FOREIGN PATENT DOCUMENTS

| | | |
|---|---|---|
| JP | 2003261677 A | 9/2003 |
| JP | 2009079103 A | 4/2009 |
| JP | 1020130112348 A | 10/2013 |

(Continued)

OTHER PUBLICATIONS

International Search Report mailed on Mar. 13, 2015 corresponding to International Application PCT/KR2014/011742.

*Primary Examiner* — Duc Truong
(74) *Attorney, Agent, or Firm* — Hauptman Ham, LLP

(57) ABSTRACT

The present invention relates to a method for preparing a polyamide resin, comprising the steps of: (a) preparing a polyamide polymer by anionically polymerizing a monomer including 2-pyrrolidone; (b) refining an unreacted monomer and a catalyst in the polyamide polymer with water; (c) pH-controlling through an ion exchange of the refined water; and (d) recovering the unreacted monomer by concentrating the pH-controlled water.

10 Claims, 1 Drawing Sheet

(56) References Cited

FOREIGN PATENT DOCUMENTS

| KR | 1020110123136 A | 11/2011 |
|---|---|---|
| KR | 1020130015154 A | 2/2013 |
| KR | 1020130097294 A | 9/2013 |

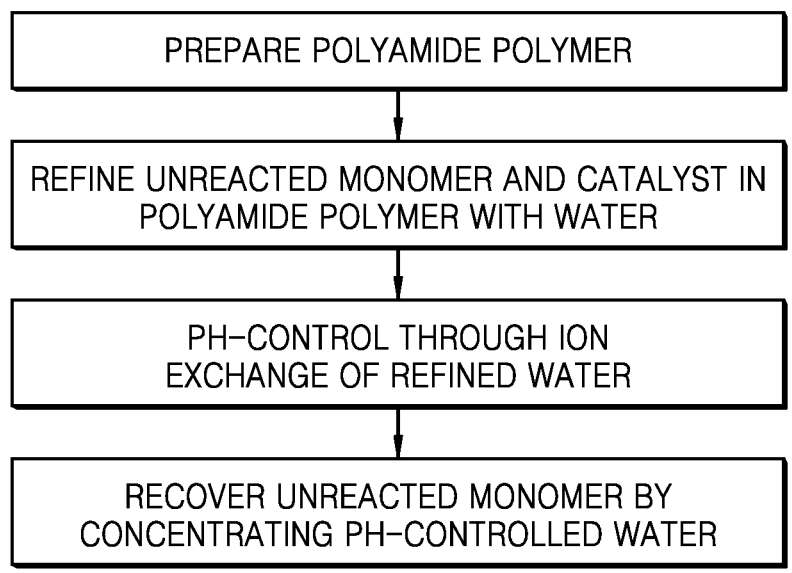

METHOD FOR PREPARING POLYAMIDE RESIN

CROSS REFERENCE TO RELATED APPLICATIONS

This application claims the priority of Korean Patent Application No. 10-2013-0149324, filed on Dec. 3, 2013, in the KIPO (Korean Intellectual Property Office). Further, this application is the National Phase Application of International Application No. PCT/KR2014/011742, filed Dec. 3, 2014, which designates the United States and was published in Korean. Both of the priority documents are hereby incorporated by reference in their entireties.

TECHNICAL FIELD

The present invention relates to a method for preparing a polyamide resin.

BACKGROUND ART

The global warming phenomenon caused by $CO_2$ emission has currently emerged as a social issue. Bio-plastic manufactured from biomass is required to be used in order to reduce the $CO_2$ emission amount. It is known that since $CO_2$, which is generated during a treatment process in which the bio-plastic is decomposed after being used, returns to the growth of the biomass, the bio-plastic does not emit $CO_2$ into the environment at all.

Therefore, the bio-plastic is a polymer material that is very environmentally friendly, and enables to be substituted for petroleum which is a fossil fuel to be depleted someday, and accordingly, research into a technology of preparing a. polyamide resin such as nylon, etc., by using the bio-plastic has been actively conducted.

In the existing method for preparing a polyamide resin by anionically polymerizing a monomer including 2-pyrrolidone, an unreacted monomer is recovered by adding an acid to a refined water to perform neutralization, thereby controlling pH, and distilling a pH-controlled water to induce concentration, wherein a salt is generated at the time of the neutralization, and accordingly, there are problems in that a salt-separation step for separating the salt is separately required, and high energy is needed for the distillation.

DISCLOSURE

Technical Problem

It is an aspect of the present invention to provide a method for preparing a polyamide resin, including: (a) preparing a polyamide polymer by anionically polymerizing a monomer including 2-pyrrolidone; (b) refining an unreacted monomer and a catalyst in the polyamide polymer with water; (c) pH-controlling through an ion exchange of the refined water; and (d) recovering the unreacted monomer by concentrating the pH-controlled water. However, technical problems to be achieved in the present invention are not limited to the above-mentioned problems, and other non-mentioned technical problems will be clearly understood to those skilled in the art from the following descriptions.

Technical Solution

In accordance with one aspect of the present invention, there is provided a method for preparing a polyamide resin, including: (a) preparing a polyamide polymer by anionically polymerizing a monomer including 2-pyrrolidone; (b) refining an unreacted monomer and a catalyst in the polyamide polymer with water; (c) pH-controlling through an ion exchange of the refined water; and (d) recovering the unreacted monomer by concentrating the pH-controlled water.

The monomer including 2-pyrrolidone in step (a) may be obtained from a biomass.

The monomer including 2-pyrrolidone in step (a) may be a single form of 2-pyrrolidone monomer; or a mixed form of the 2-pyrrolidone monomer and a C5-C7 lactam monomer.

In step (a), an alkaline catalyst may be added at the time of the anionically polymerizing.

In step (a), a $CO_2$ initiator and an isocyanate-based compound may be added at the time of the anionically polymerizing.

In step (b), the refining may be performed in a counter current manner.

In step (d), the concentrating may be performed in a membrane filtration manner.

It may be further performed in a distillation manner.

The membrane filtration manner may be performed by reverse osmotic membrane, nano filtration membrane, pervaporation, or membrane distillation.

The polyamide resin may be a resin polymerized with 2-pyrrolidone monomer; or a resin in which the 2-pyrrolidone monomer is polymerized with a C5-C7 lactam monomer.

Advantageous Effects

The method for preparing the polyamide resin of the present invention is advantageous in that the polyamide polymer may be prepared by anionically polymerizing the monomer including 2-pyrrolidone, and the unreacted monomer and the catalyst in the polyamide polymer may be refined with water in a counter current manner, thereby minimizing a used amount of water. In addition, a separate salt-separation step may be omitted by pH-controlling through an ion exchange of the refined water, and the unreacted monomer may be recovered by concentrating the pH-controlled water in a membrane filtration manner, thereby reducing energy.

DESCRIPTION OF DRAWINGS

FIG. 1 schematically shows a method for preparing a polyamide resin according to the present invention.

BEST MODE

The present inventors confirmed that in preparing a polyamide resin by anionically polymerizing a monomer including 2-pyrrolidone, an unreacted monomer is capable of being effectively recovered by pH-controlling through an ion exchange of refined water, and completed the present invention.

Hereinafter, the present invention will be described in detail.

FIG. 1 schematically shows a method for preparing a polyamide resin according to the present invention.

As shown in FIG. 1, the present invention provides a method for preparing a polyamide resin including:

(a) preparing a polyamide polymer by anionically polymerizing a monomer including 2-pyrrolidone;

(b) refining an unreacted monomer and a catalyst in the polyamide polymer with water;

(c) pH-controlling through an ion exchange of the refined water; and (d) recovering the unreacted monomer by concentrating the pH-controlled water.

Step (a) is a step of preparing the polyamide polymer by anionically polymerizing the monomer including 2-pyrrolidone.

The monomer including 2-pyrrolidone in step (a) may be obtained from a biomass.

The monomer including 2-pyrrolidone in step (a) is preferably a single form of 2-pyrrolidone monomer; or a mixed form of the 2-pyrrolidone monomer and a C5-C7 lactam monomer, but is not limited thereto. When the single form of 2-pyrrolidone monomer is used as the monomer including 2-pyrrolidone, a resin polymerized with 2-pyrrolidone monomer (Nylon 4 resin) may be prepared, and when the mixed form of the 2-pyrrolidone monomer and the C5-C7 lactam monomer is used as the monomer including 2-pyrrolidone, a resin in which the 2-pyrrolidone monomer is polymerized with the C5-C7 lactam monomer (Nylon 4,6 resin) may be prepared.

Specifically, glutamic acid or sodium glutamate produced by microbial fermentation as a starting material and glutamic acid decarboxylase (GAD) as a catalyst may be used to prepare 4-aminobutyric acid, and then, the 2-pyrrolidone may be obtained from the 4-aminobutyric acid by using a catalyst or a dehydrating agent.

The monomer including 2-pyrrolidone in step (a) is preferably the single form of 2-pyrrolidone monomer; or the mixed form of the 2-pyrrolidone monomer and the C5-C7 lactam monomer, but the form of the monomer including 2-pyrrolidone is not limited thereto. Examples of the C5-C7 lactam monomer may include piperidone, caprolactam, enantholactam, etc. When the single form of 2-pyrrolidone monomer is used as the monomer including 2-pyrrolidone, the Nylon 4 resin may be prepared, and when the mixed form of the 2-pyrrolidone monomer and the C5-C7 lactam monomer is used as the monomer including 2-pyrrolidone, a resin in which the 2-pyrrolidone monomer is polymerized with the C5-C7 lactam monomer (for example, Nylon 4,6 resin in which the 2-pyrrolidone monomer is polymerized with ϵ-caprolactam) may be prepared.

In step (a), it is preferred to add an alkaline catalyst at the time of the anionically polymerizing, but the present invention is not limited thereto. Here, as the alkaline catalyst, potassium hydroxide (KOH), potassium carbonate ($K_2CO_3$), sodium hydroxide (NaOH), etc., may be used. As described above, since the alkaline catalyst is used for the anionically polymerizing, the refined water maintains a strong base state.

In step (a), it is preferred to add at least any one of a $CO_2$ initiator and an isocyanate-based compound at the time of the anionically polymerizing, but the present invention is not limited thereto. It is preferred to use the $CO_2$ initiator and the isocyanate-based compound together in view of a high yield, and a high molecular weight. Here, as the isocyanate-based compound, benzyl isocyanate, 4,4-methylenebis(phenyl isocyanate), toluene-2,4-diisocyanate, p-phenylene diisocyanate, 1,6-hexamethylene diisocyanate, isophoron diisocyanate, [4,4-benzylidenebis(6-methyl-m-phenylene) tetraisocyanate], silicon tetraisocyanate, methylidynetri-p-phenylene triisocyanate, etc., may be used.

Step (b) is a step of refining the unreacted monomer and the catalyst in the polyamide polymer with water.

In step (b), the refining may be performed in a counter current manner. Here, the counter current manner refers to a case in which when there is a heat movement or a material movement between two fluids, a direction in which one fluid flows is opposite to a direction in which the other fluid flows. The unreacted monomer and the catalyst in the polyamide polymer may be refined with water in the counter current manner, thereby minimizing a used amount of water.

Step (c) is a step of pH-controlling through an ion exchange of the refined water.

In the existing method for preparing a polyamide resin by anionically polymerizing a monomer including 2-pyrrolidone, an unreacted monomer is stably recovered by adding an acid to a refined water to perform neutralization, thereby controlling pH, wherein a salt is generated at the time of the neutralization, and accordingly, there is problem in that a salt-separation step for separating the salt is separately required. However, the method according to the present invention is advantageous in that the separate salt-separation step may be omitted by the pH-controlling through the exchange of ions such as $K^+$, $Na^+$, etc., of the refined water.

Step (d) is a step of recovering the unreacted monomer by concentrating the pH-controlled water.

In step (d), the concentrating may be performed in a membrane filtration mariner, and may be further performed in a distillation manner in addition to the membrane filtration manner.

The membrane filtration manner is preferably performed by reverse osmotic membrane, nano filtration membrane, pervaporation, or membrane distillation, but the present invention is not limited thereto. Here, the reverse osmotic membrane refers to a semi-permeable membrane used to generate a reverse osmosis phenomenon, which has a pore size of 0.01 to 0.1 nm, and the nano filtration membrane refers to a semi-permeable membrane used to separate ions or solutions, which has a pore size of 0.1 to 5 nm. In addition, the pervaporation refers to a membrane separation method for vaporizing liquid through a membrane by contacting liquid with the membrane. The membrane distillation refers to a method for separating a solution through flashing evaporation and condensation processes such as a multi-stage evaporation method, wherein it is possible to be operated at a low pressure by installing a hydrophobic membrane between an evaporator and a condenser so that only steam passes through the hydrophobic membrane.

The existing method for preparing the polyamide resin by anionically polymerizing the monomer including 2-pyrrolidone has a problem in that since the pH-controlled water is distilled to induce concentration, high energy is required for distillation. However, the method according to the present invention is advantageous in that the pH-controlled water is concentrated in the membrane filtration manner to recover the unreacted monomer, thereby reducing energy.

In addition, according to the distillation manner that is further performed, the pH-controlled water may be highly concentrated to more effectively recover the unreacted monomer.

The polyamide resin may be a resin polymerized with 2-pyrrolidone monomer; or a resin in which the 2-pyrrolidone monomer is polymerized with the C5-C7 lactam monomer.

The resin polymerized with the 2-pyrrolidone monomer is also referred to as Nylon 4 resin. In addition, the resin in which the 2-pyrrolidone monomer is polymerized with ϵ-caprolactam as the C5-C7 lactam monomer is referred to as Nylon 4,6 resin, which is prepared by mutual supplementation of physical properties of Nylon 4 (resin homo-polymerized with the 2-pyrrolidone monomer) and Nylon 6 (resin homo-polymerized with ϵ-caprolactam having a carbon number of 6).

The method for preparing the polyamide resin of the present invention is advantageous in that the polyamide polymer may be prepared by anionically polymerizing the monomer including 2-pyrrolidone, and the unreacted monomer and the catalyst in the polyamide polymer may be refined with water in the counter current manner, thereby minimizing a used amount of water. In addition, the salt-separation step may be omitted by pH-controlling through the ion exchange of the refined water, and the unreacted monomer may be recovered by concentrating the pH-controlled water according to the membrane filtration manner, thereby reducing energy.

Hereinafter, preferred exemplary embodiments of the present invention will be described to assist in understanding the present invention. However, the following exemplary embodiments are provided only to more easily understand the present invention, and accordingly, the present invention is not limited thereto.

EXAMPLE 1

A Nylon 4 polymer was prepared by anionically polymerizing 2-pyrrolidone (85 g) as a monomer, potassium hydroxide (KOH) (8.4 g) as an alkaline catalyst, a $CO_2$ initiator (1.76 g), and 1,6-hexamethylene diisocyanate (0.32 g) as an isocyanate-based compound. 2-pyrrolidone as an unreacted monomer and potassium hydroxide (KOH) as the alkaline catalyst in the Nylon 4 polymer were refined with water (425 ml). In the water after the refining, a concentration of the 2-pyrrolidone was 5.0 wt % [measured by gas chromatography (GC)], and a concentration of $K^+$ ions was 0.9 wt % [measured by ion chromatography (IC)], and pH was 12.5. The $K^+$ ions were removed from the refined water through an ion exchange using a cation exchange resin (LEWATIT Company, MonoPlus S 108H, used in an amount of 6 to 8 wt % relative to a weight of water), such that pH was controlled (pH 7~8). The pH-controlled water passed through reverse osmotic membrane and concentrated by distillation to recover 2-pyrrolidone as the unreacted monomer, thereby finally preparing the Nylon 4 resin.

EXAMPLE 2

Example 2 was conducted in the same manner as in Example 1 above, except for using 2-pyrrolidone and ε-caprolactam as a monomer.

The method for preparing the polyamide resins (Nylon 4 resin and Nylon 4,6 resin) according to Examples 1 and 2 of the present invention is advantageous in that the polyamide polymers (Nylon 4 polymer and Nylon 4,6 copolymer) may be prepared by anionically polymerizing the monomers including 2-pyrrolidone, respectively, and the unreacted monomers and the catalyst in the polyamide polymers (Nylon 4 polymer and Nylon 4,6 copolymer) may be refined with water in the counter current manner, thereby minimizing a used amount of water. In addition, the salt-separation step may be omitted by pH-controlling through an ion exchange of the refined water, and the unreacted monomers may be recovered by concentrating the pH-controlled water in the membrane filtration manner, thereby reducing energy.

The above description of the present invention is provided for illustrative purposes, and it will be understood to those skilled in the art that the exemplary embodiments can be easily modified into various specific forms without departing from the technical idea or essential features of the present invention. Accordingly, the exemplary embodiments described herein are provided by way of example only in all aspects and should not be construed as being limited thereto.

The invention claimed is:

1. A method for preparing a polyamide resin, comprising:
    (a) preparing a polyamide polymer by anionically polymerizing a monomer including 2-pyrrolidone;
    (b) refining an unreacted monomer and a catalyst in the polyamide polymer with water;
    (c) pH-controlling through an ion exchange of the refined water; and
    (d) recovering the unreacted monomer by concentrating the pH-controlled water.

2. The method of claim 1, wherein the monomer including 2-pyrrolidone in step (a) is obtained from a biomass.

3. The method of claim 1, wherein the monomer including 2-pyrrolidone in step (a) is a single form of 2-pyrrolidone monomer; or a mixed form of the 2-pyrrolidone monomer and a C5-C7 lactam monomer.

4. The method of claim 1, wherein in step (a), an alkaline catalyst s added at the time of the anionically polymerizing.

5. The method of claim 1, wherein in step (a), a $CO_2$ initiator and an isocyanate-based compound are added at the time of the anionically polymerizing.

6. The method of claim 1, wherein in step (b), the refining is performed in a counter current manner.

7. The method of claim 1, wherein in step (d), the concentrating is performed in a membrane filtration manner.

8. The method of claim 7, wherein it is further performed in a distillation manner.

9. The method of claim 7, wherein the membrane filtration manner is performed by reverse osmotic membrane, nano filtration membrane, pervaporation, or membrane distillation.

10. The method of claim 1, wherein the polyamide resin is a resin polymerized from 2-pyrrolidone monomer; or a resin polymerized from 2-pyrrolidone monomer and a C5-C7 lactam monomer.

* * * * *